(12) United States Patent
Mukouhara

(10) Patent No.: US 9,862,021 B2
(45) Date of Patent: Jan. 9, 2018

(54) CONNECTING ROD FOR INTERNAL COMBUSTION ENGINE

(71) Applicant: HONDA MOTOR CO., LTD., Tokyo (JP)

(72) Inventor: Hodaka Mukouhara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 14/840,145

(22) Filed: Aug. 31, 2015

(65) Prior Publication Data

US 2016/0091013 A1    Mar. 31, 2016

(30) Foreign Application Priority Data

Sep. 26, 2014   (JP) ................................ 2014-197141

(51) Int. Cl.

| | | |
|---|---|---|
| F02B 75/32 | (2006.01) | |
| B21D 53/84 | (2006.01) | |
| B21K 1/76 | (2006.01) | |
| F16C 9/04 | (2006.01) | |
| F16C 23/04 | (2006.01) | |
| F16J 7/00 | (2006.01) | |

(Continued)

(52) U.S. Cl.
CPC .............. B21K 1/766 (2013.01); F16C 9/04 (2013.01); F16C 23/041 (2013.01); F16C 33/14 (2013.01); F16J 7/00 (2013.01); F16C 17/02 (2013.01); F16C 33/121 (2013.01); F16C 2223/06 (2013.01); F16C 2223/30 (2013.01); F16C 2240/30 (2013.01); F16C 2240/60 (2013.01); F16C 2360/22 (2013.01)

(58) Field of Classification Search
CPC .......... F16C 7/023; F16C 9/04; F16C 23/041; F16C 33/12; F16C 33/14; F16C 17/02; F16C 33/121; F16C 2223/06; F16C 2223/30; F16C 2240/30; F16C 2240/60; F16J 7/00; B21K 1/766

USPC ........... 123/197.3, 197.4; 29/88.09, 888.051, 29/888.091, 888.092, 888.074

See application file for complete search history.

(56) References Cited

U.S. PATENT DOCUMENTS

| | | | |
|---|---|---|---|
| 6,273,612 B1 * | 8/2001 | Ono ........................ | F16C 9/04 384/276 |
| 8,079,145 B2 * | 12/2011 | McEwan ................. | F16C 7/023 123/197.3 |
| 2013/0091980 A1 * | 4/2013 | Domanchuk ............ | F16C 9/04 74/579 E |

FOREIGN PATENT DOCUMENTS

| | | |
|---|---|---|
| JP | S60134962 U | 9/1985 |
| JP | H0579036 U | 10/1993 |

(Continued)

*Primary Examiner* — Lindsay Low
*Assistant Examiner* — Syed O Hasan
(74) *Attorney, Agent, or Firm* — Squire Patton Boggs (US) LLP

(57) ABSTRACT

A base-material hole is formed in a connecting-rod base material. A coating layer is deposited on an inner peripheral surface of the base-material hole. The base-material hole 15 has a cylinder inner-surface portion of a constant inner diameter, formed in a central region in an axial direction, and a tapered inner-surface portion that is continuous with an axially outer side of the cylinder inner-surface portion and is radially enlarged in an axially outward direction. The coating layer has a first coating portion and a second coating portion deposited on the tapered inner-surface portion to adjoin the first coating portion and gradually increasing in material thickness in the axially outward direction.

8 Claims, 6 Drawing Sheets

(51) Int. Cl.
*F16C 33/14* (2006.01)
*F16C 17/02* (2006.01)
*F16C 33/12* (2006.01)

(56) References Cited

FOREIGN PATENT DOCUMENTS

| JP | H07158630 A | 6/1995 |
| JP | H094463 A | 1/1997 |
| JP | 2001-511500 A | 8/2001 |
| JP | 2013245767 A | 12/2013 |
| JP | 2014177968 A | 9/2014 |
| WO | WO 99/05423 A1 | 2/1999 |

* cited by examiner

CONNECTING ROD FOR INTERNAL COMBUSTION ENGINE

BACKGROUND

Field

The present invention relates to a connecting rod for an internal combustion engine.

Description of the Related Art

In an internal combustion engine, a connecting rod connects a piston pin to a crankpin so that the reciprocating motion of the piston along the axis of the cylinder is converted to the rotating motion of the crankshaft. The connecting rod has a small-diameter connecting hole formed in one end for connection to the piston pin, and a large-diameter connecting hole formed in the other end for connection to the crankpin.

During operation of the internal combustion engine, a large load acts from an edge of the connecting hole of the connecting rod on a power transmitting pin such as the piston pin, the crankpin or the like. Therefore, a connecting rod devised for improvement in wear resistance property of the power transmitting pin is formed such that the inner peripheral face of a base-material hole of connecting-rod base material is covered with a coating material softer than the connecting-rod base material by plating or the like in order to form a connecting hole (for example, see JP-A No. 2001-511500 (Patent Literature 1)).

In the above-described connecting rod of the related art, when a large load acts on the power transmitting pin from the edge of the connecting hole, the soft coating material applied to the connecting hole is elastically deformed, thereby reducing the contact pressure acting on the power transmitting pin from the edge of the connecting hole.

As the engine operating speed is increased in an internal combustion engine, the power transmitting pin bends, so that the axial end of the power transmitting pin is strongly pressed against a portion around the axially outer end of the connecting hole of the connecting rod.

However, in the above-described connecting rod in the related art, the constant-inner-diameter inner-peripheral face of the base-material hole forming part of the connecting hole is uniformly coated with the coating material. Because of this, it is difficult to reduce with efficiency the constant pressure exerted on a portion of the power transmitting pin coming into contact with a portion around the axially outer end of the connecting hole.

SUMMARY

Accordingly, embodiments of the present invention provide a connecting rod for an internal combustion engine enabling an efficient reduction in contact pressure exerted on a power transmitting pin from a region around an axially outer end of a connecting hole.

To address the aforementioned problem, a connecting rod for an internal combustion engine according to an embodiment of the present invention comprises a connecting hole through which a power transmitting pin is slidably fitted. The connecting hole is formed by coating an inner peripheral surface of a base-material hole formed in a connecting-rod base material, with a coating material softer than the connecting-rod base material. In the connecting rod, the base-material hole can include a cylinder inner-surface portion of a constant inner diameter, formed in a central region in an axial direction. A tapered inner-surface portion is continuous with an axially outer side of the cylinder inner-surface portion, and is radially enlarged in an axially outward direction. The coating layer formed of the coating material can include a first coating portion deposited on the cylinder inner-surface portion and can have an inner face with an approximately constant inner diameter. A second coating portion can be deposited on the tapered inner-surface portion to adjoin the first coating portion and gradually increasing in material thickness in the axially outward direction.

As a result, because the coating material softer than the connecting-rod base material is deposited on the tapered inner-surface portion of the base-material hole, and the material thickness of the second coating portion continuous with the first coating portion is gradually increased toward the outside in the axial direction, the cushioning effect produced by the coating material is enhanced increasingly in an axially further outer region of the connecting hole when the power transmitting pin fitted through the connecting hole bends.

An inner peripheral face of the second coating portion may be formed continuously with the first coating portion to have an approximately constant inner diameter.

In this case, when the bending of the power transmitting pin is small, the power transmitting pin can be supported on a wide range of the first coating portion and the second coating portion. Accordingly, a reduction in contact pressure on the power transmitting pin when the bending of the power transmitting pin is small occurs.

The continuous inner peripheral face of the first coating portion and the second coating portion may be formed as a removal-machined surface.

In this case, the inner peripheral surface of the first coating portion and the second coating portion can be formed as a continuously, approximately constant inner diameter surface with ease and accuracy by removal machining.

The coating layer may include a third coating portion being continuous with an axially outward side of the second coating portion and having an inner peripheral face radially enlarged in the axially outward direction.

In this case, when the power transmitting pin largely bends, a wider range of the coating layer is made to readily follow the bending of the power transmitting pin. Therefore, it is possible to further reduce the contact pressure acting on the power transmitting pin from the region around the axially outward end of the connecting hole when the bending of the power transmitting pin is large.

The tapered inner-surface portion of the base-material hole preferably has a diameter expansion rate in an axially outer region set to be larger than a diameter expansion rate in an axially inner region.

In this case, the third coating portion can be easily formed on the axially outer side of the second coating portion.

The tapered inner-surface portion of the base-material hole may be formed of a tapered surface with a plurality of stages in which the taper angle is changed in multi-stages.

In this case, the tapered inner-surface portion of the base-material hole with the diameter expansion rate being varied can be readily formed by removal machining such as cutting, grinding and/or the like.

The tapered inner-surface portion of the base-material hole may have a first tapered portion arranged adjacent to an axially outer side of the cylinder inner-surface portion, and a second tapered portion arranged adjacent to an axially outer side of the first tapered portion. An angle which the cylinder inner-surface portion forms with the first tapered portion may be set to be greater than an angle which the first tapered portion forms with the second tapered portion.

In this case, when the power transmitting pin bends significantly, the power transmitting pin hardly receives a large contact pressure from the vicinity of the axially outward end of the connecting hole.

According to embodiments of the present invention, because the coating material softer than the connecting-rod base material is deposited on the tapered inner-surface portion of the base-material hole and the material thickness of the second coating portion adjoining the first coating portion is gradually increased toward the outside in the axial direction, it is possible to reduce, with efficiency, the contact pressure exerted on the power transmitting pin from the vicinity of the axially outer end of the connecting hole.

DETAILED DESCRIPTION

Embodiments according to the present invention will be described in detail below with reference to the accompanying drawings.

Figure 1:
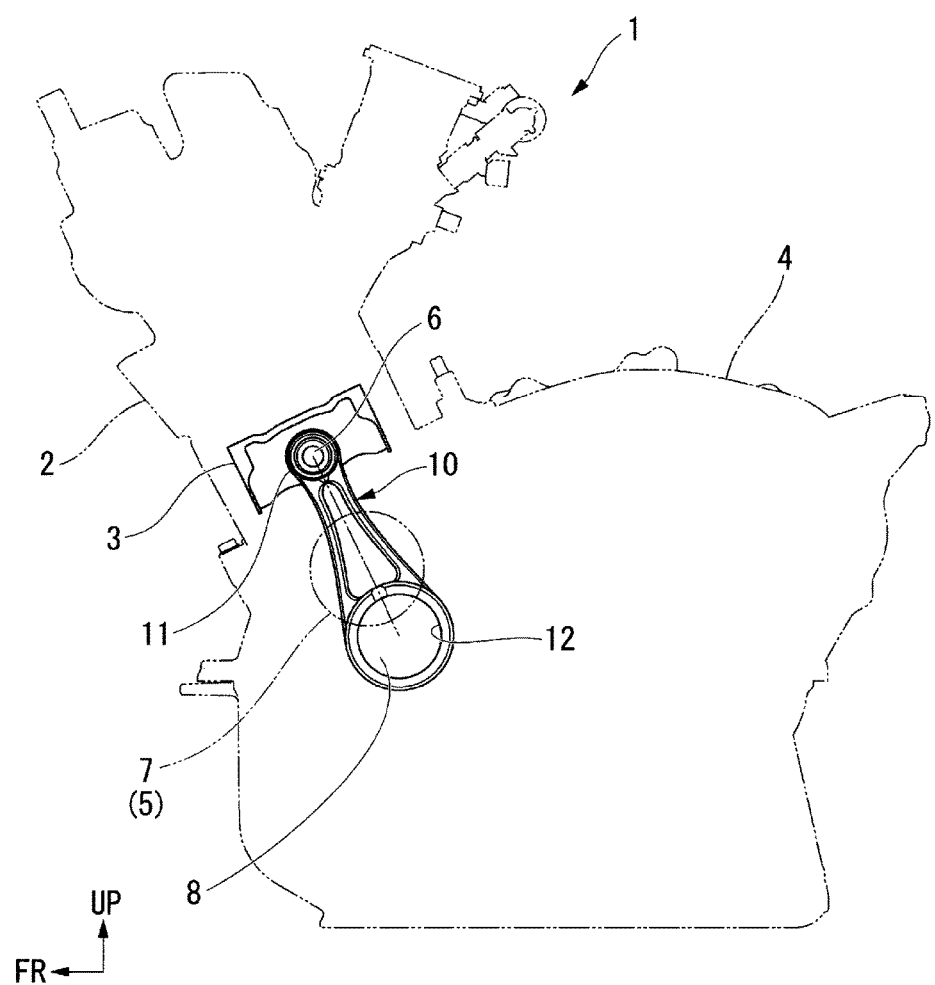
FIG. 1 is a side view of an internal combustion engine according to an embodiment of the present invention.

FIG. 1 is a schematic diagram of an internal combustion engine 1 into which a connecting rod 10 according to an embodiment is adopted. The internal combustion engine 1 is used in saddle-ride type vehicles such as motorcycles and the like. In the drawings, arrow FR points in the forward direction of the internal combustion engine 1 on board of the vehicle, while arrow UP points in the upward direction of the same.

As illustrated in FIG. 1, a piston 3 is slidably housed in a cylinder unit 2 of the internal combustion engine 1, and a crankshaft 5 is rotatably supported in a crankcase 4 below the cylinder unit 2. A piston pin 6 is mounted within the piston 3 to extend along a radial direction. A crankpin 8 is provided integrally with the crankshaft 5 and eccentrically to a rotating shaft 7 of the crankshaft 5. In the case of certain embodiments, the piston pin 6 constitutes the power transmitting pin.

Figure 2:
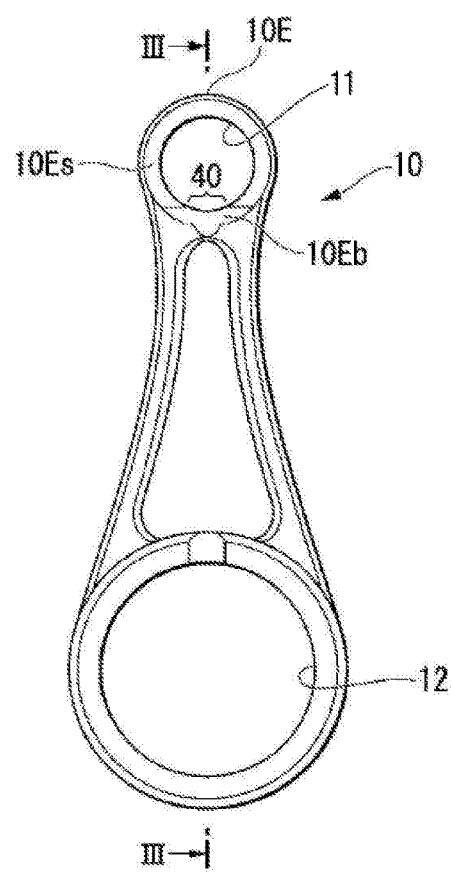
FIG. 2 is a front view of a connecting rod according to an embodiment of the present invention.
Figure 3:
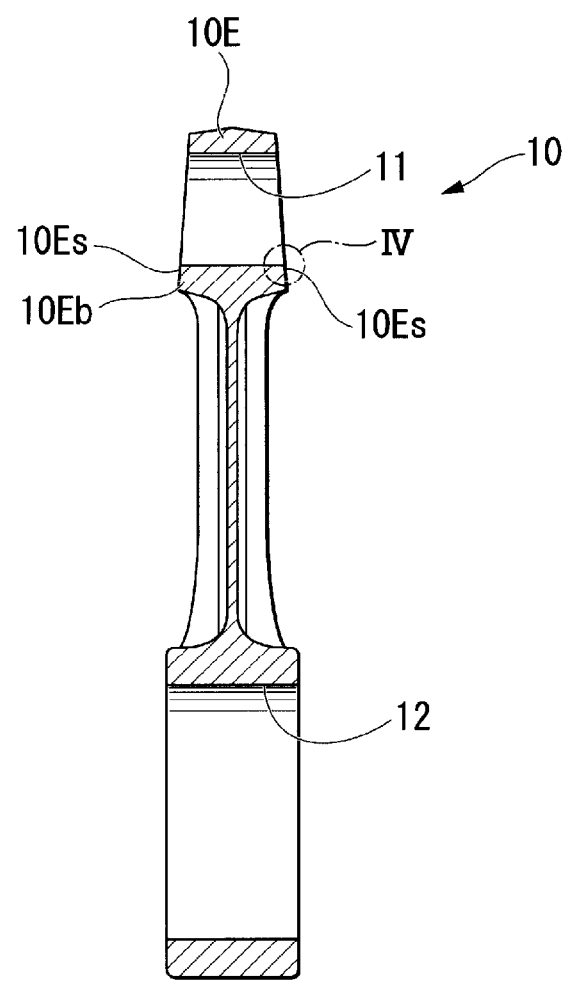
FIG. 3 is a sectional view corresponding to a section III-III in FIG. 2 showing the connecting rod according to the embodiment of the present invention.

FIG. 2 and FIG. 3 are diagrams illustrating the connecting rod 10.

As shown in these diagrams, the connecting rod 10 has a small-diameter connecting hole 11 formed in one end in the longitudinal direction, and a large-diameter connecting hole 12 formed in the other end in the longitudinal direction. The piston pin 6 is slidably fitted into the small-diameter connecting hole 11. The crankpin 8 is slidably fitted into the large-diameter connecting hole 12. A principal part (connecting-rod base material) of the connecting rod 10 is formed by casting or forging of chromium-molybdenum steel, carbon steel, aluminum alloy or the like.

The end of the connecting rod 10 with the small-diameter connecting hole 11 formed in and the other end with the large-diameter connecting hole 12 formed in are each formed in an approximately cylindrical shape as shown in FIG. 3. However, the end (the approximately-cylindrical portion) with the small-diameter connecting hole 11 formed in is formed in an approximately trapezoidal shape in the cross section such that a proximal portion 10Eb (lower side in FIG. 3) of the connecting rod 10 has a greater width in the axial direction than that of an extended end 10E (upper side in FIG. 3). Accordingly, in the small-diameter connecting hole 11, the explosion load acting on the piston 3 during engine operation is able to be advantageously received on a larger area.

Figure 4:
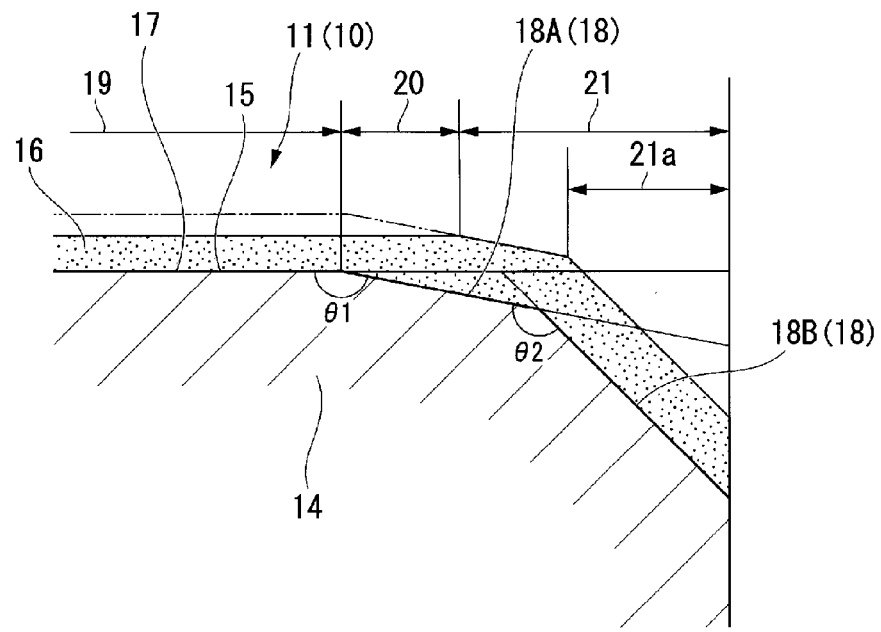
FIG. 4 is a sectional view corresponding to the IV-IV part in FIG. 3 showing the connecting rod according to the embodiment of the present invention.
Figure 5:
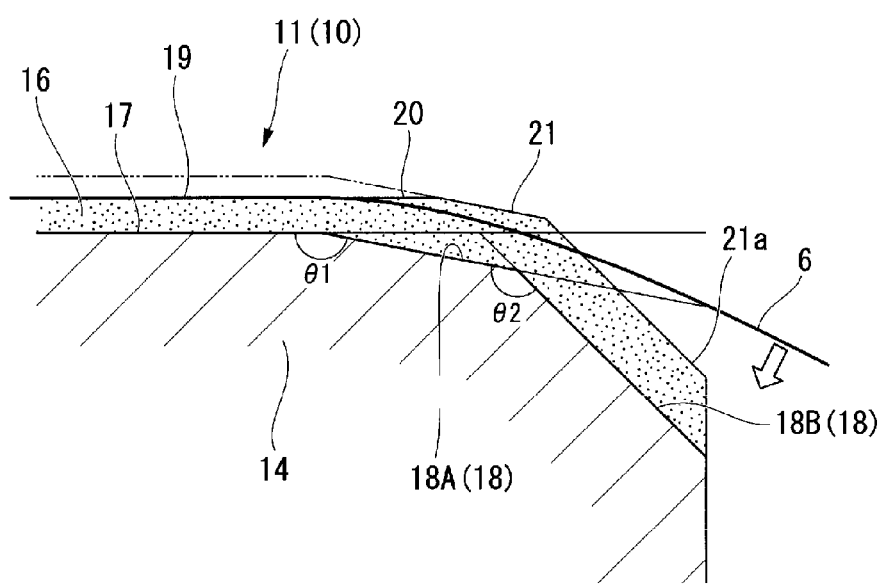
FIG. 5 is a sectional view corresponding to the IV-IV part in FIG. 3 showing the connecting rod according to the embodiment of the present invention.

FIG. 4 and FIG. 5 are enlarged sectional views of IV part of the connecting rod 10 shown in FIG. 3.

For the small-diameter connecting hole 11 of the connecting rod 10, the inner peripheral face of a base-material hole 15 drilled through the connecting-rod base material 14 is covered with a coating layer 16 formed of coating material, such as copper alloy or the like, softer than the connecting-rod base material 14, by plating or the like.

The base-material hole 15 has a constant-inner-diameter cylinder inner-surface portion 17 which is formed in an approximately central region in the axis direction, and a tapered inner-surface portion 18 which is continuous with the axially outer side of the cylinder inner-surface portion 17 and is radially enlarged in the axially outward direction. FIG. 4 and FIG. 5 show only a region of one axial end of the base-material hole 15 (the right side region in FIG. 3), but a region of the other axial end of the base-material hole 15 (the left side region in FIG. 3) is of the same structure.

In the case of the embodiment, the tapered inner-surface portion 18 of the base-material hole 15 is made up of a first tapered portion 18A and a second tapered portion 18B so that the taper angle is changed in two stages (a plurality of stages). The first tapered portion 18A is arranged adjacent to the axially outer side of the cylinder inner-surface portion 17, and the second tapered portion 18B is arranged adjacent to the axially outer side of the first tapered portion 18A. The angle θ1 which the cylinder inner-surface portion 17 forms with the first tapered portion 18A is set to be greater than the angle θ2 which the first tapered portion 18A forms with the second tapered portion 18B. Therefore, the tapered inner-surface portion 18 of the base-material hole 15 is set to have a lower diameter expansion rate in the axially inner region than the diameter expansion rate in the axially outer region. In the case of the embodiment, the tapered inner-surface portion 18 of the base-material hole 15 is formed of tapered surface with a plurality of stages (two stages) in which the taper angle is changed in multi-stages.

In this example, the second tapered portion 18B of the tapered inner-surface portion 18 is formed by chamfering, in a tapering manner, a part of the peripheral edge (a lower edge region in FIG. 2) of the connecting hole 11 on an axial end face 10Es of the extended end 10E (upper side in FIG. 2) of the connecting rod 10 on the connecting hole 11 side as illustrated in FIG. 2. Reference sign 40 in FIG. 2 denotes the chamfered portion.

However, the second tapered portion 18B may be formed throughout the entire peripheral edge of the connecting hole 11 on the axial end face 10Es of the extended end 10E of the connecting rod 10 on the connecting hole 11 side.

The coating layer 16 has a first coating portion 19 applied to the cylinder inner-surface portion 17, and having an approximately constant inner diameter of the inner surface. A second coating portion 20 is applied to the tapered inner-surface portion 18 and has a region contiguous with the first coating portion 19 and gradually increasing in material thickness in the axially outward direction. A third coating portion 21 is continuous with the axially outer side of the second coating portion 20, and is applied to the tapered inner-surface portion 18 and having the inner peripheral face radially enlarged in the axially outward direction. In the third coating portion 21, the inner peripheral surface is radially enlarged in two stages in the axially outward direction. Reference sign 21a in the drawings denotes a stepped coating portion in which the inner peripheral face is radially enlarged gradually in the axially outer region of the third coating portion 21.

Note that the third coating portion 21 continuous with the axial outer side of the second coating portion 20 is formed to have an approximately constant material thickness over the entire range. The third coating portion 21 is applied to lie astride the first tapered portion 18A and the second tapered portion 18B of the tapered inner-surface portion 18 of the base-material hole 15. Therefore, while having an approximately constant thickness, the third coating portion 21 has the inner peripheral face radially enlarged gradually in the axially outward direction.

Figure 6A:
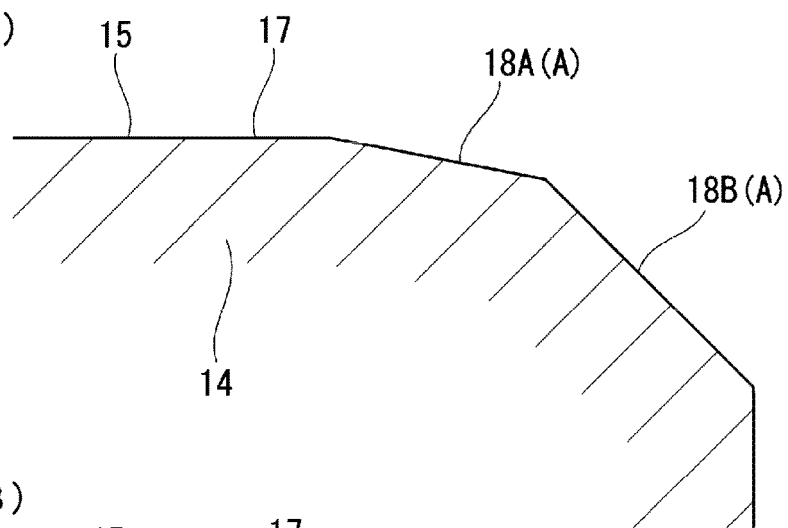
FIGS. 6(A)-6(C) show sectional views corresponding to the IV-IV part in FIG. 3, illustrating, in the order of 6(A), 6(B) and then 6(C), the process of manufacturing the connecting rod according to the embodiment of the present invention.

An example of how to machine the connecting hole 11 in the connecting rod 10 according to the embodiment will now be described with reference to FIGS. 6(A)-6(C).

The connecting-rod base material 14 is shaped by casting or forging, and then the inner surface of the base-material hole 15 is machined by cutting, grinding or the like. In this stage, as illustrated in FIG. 6(A), the cylinder inner-surface portion 17 and the tapered inner-surface portion 18 (the first tapered portion 18A and the second tapered portion 18B) are formed in the base material hole 15.

Figure 6B:
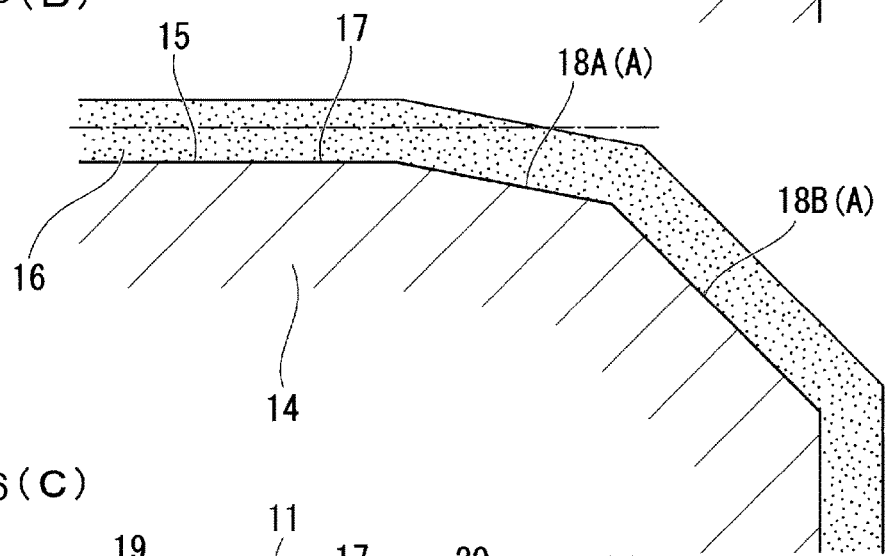

The coating material is deposited on the base-material hole 15 after the above-described machining, to have an approximately uniform thickness by plating or the like as illustrated in FIG. 6(B).

Figure 6C:
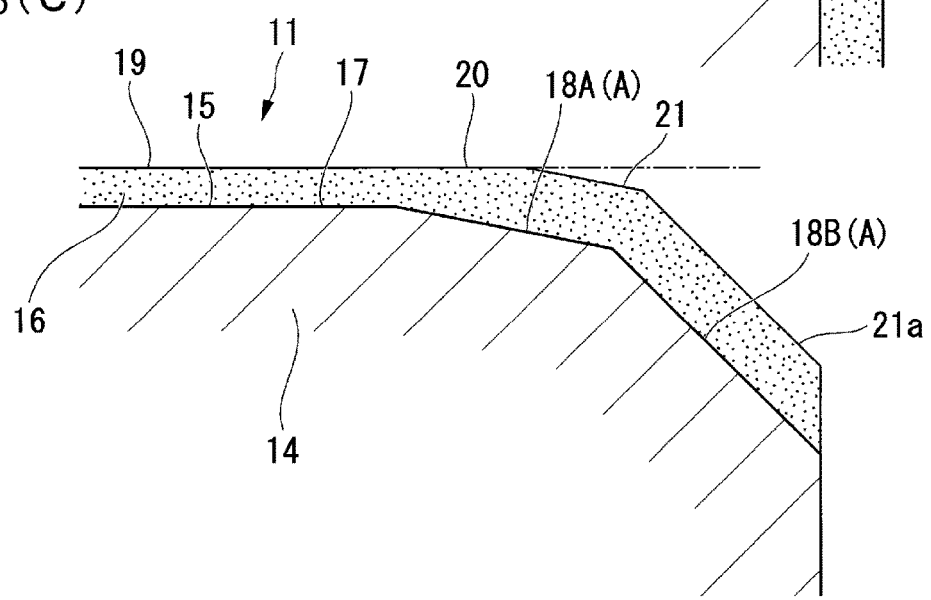

The inner surface of the area coated with the coating material is subjected to removal machining such as honing or the like so that the inner surface is made approximately parallel to the cylinder inner-surface portion 17 of the base-material hole 15, as shown in FIG. 6(C). Thus, a predetermined thickness of the coating material deposited is removed from an axial central region of the area coated with the coating material. As a result, the portion of the coating material covering the cylinder inner-surface portion 17 has an approximately uniform thickness, while a portion of the coating material covering the tapered inner-surface portion 18 includes a portion gradually increasing in material thickness in the axially outward direction beginning with the point arranged adjacent to the cylinder inner-surface portion 17. The portion of the uniform thickness covering the cylinder inner-surface portion 17 serves as the first coating portion 19, and the portion gradually increasing in material thickness beginning with the point arranged adjacent to the cylinder inner-surface portion 17 serves as the second coating portion 20. The unremoved portion of the coating material deposited on the tapered inner-surface portion 18 serves as the third coating portion 21.

As described above, in the connecting rod 10 according to the embodiment, the coating material softer than the connecting-rod base material 14 is deposited on the tapered inner-surface portion 18 of the base-material hole 15, and the material thickness of the coating material in the second coating portion 20 adjoining the first coating portion 19 is gradually increased in the axially outward direction. For this reason, the application of the connecting rod 10 according to the embodiment to an internal combustion engine 1 enables an efficient reduction in contact pressure acting on the piston pin 6 from the portion around the axially outer end of the connecting hole 11.

When a load acting on the piston pin 6 from the piston 3 becomes larger by the explosion load generated during the operation of the internal combustion engine 1 to cause the axial end of the piston pin 6 to bend largely in the up-and-down direction, typically, the bending causes the contact pressure acting to tend to be increasingly larger as closer to the axially outermost region of the connecting hole 11. However, in the connecting rod 10 according to the embodiment, the tapered inner-surface portion 18 radially enlarged in the axially outward direction is formed in a position outside the cylinder inner-surface portion 17 of the base-material hole 15. Further, the coating material softer than the connecting-rod base material 14 is deposited on the cylinder inner-surface portion 17 and the tapered inner-surface portion 18, and also the material thickness of the second coating portion 20 deposited on the tapered inner-surface portion 18 is gradually increased toward the outside in the axial direction. As a result, the further axially outer is the region of the connecting hole 11 in which the contact pressure is easily increased by the bending of the piston pin 6, the more the cushioning effect of the coating material can be enhanced. Accordingly, in the connecting rod 10, an efficient reduction in contact pressure acting on the piston pin 6 from the region around the axially outer end of the connecting hole 11 is made possible.

Further, in the connecting rod 10 according to the embodiment, the second coating portion 20 deposited on the tapered inner-surface portion 18 is formed continuously with the first coating portion 19 to have an approximately constant inner diameter. Because of this, when the bending of the piston pin 6 is small, the piston pin 6 is supported in the wide range of the first coating portion 19 and the second coating portion 20. Accordingly, by employing the connecting rod 10 according to the embodiment, even when the bending of the piston pin 6 is small, the contact area between the piston pin 6 and the connecting hole 11 can be increased for an improvement in wear resistance property.

Further, in the connecting rod 10 according to certain embodiments, because the continuous inner peripheral face with the constant inner diameter of the first coating portion 19 and the second coating portion 20 is a removal-machined face by honing and/or the like, the inner peripheral surface of the first coating portion 19 and the second coating portion 20 is formed as a continuously approximately constant inner diameter surface with ease and accuracy.

Further, the third coating portion 21 is further provided in a position axially outward of the second coating portion 20 of the coating layer 16 and has the inner peripheral face radially enlarged in the axially outward direction. Because of this, when the piston pin 6 significantly bends in the up-and-down direction, a wider range of the coating layer 16 is made to readily follow the bending of the piston pin 6. Therefore, a further advantageous reduction in contact pressure acting on the piston pin 6 from the edge of the connecting hole 11 at the time of the application of a large load is made possible.

Further, in this example of connecting rod 10, the second coating portion 20 gradually increasing in material thickness is placed outside and continuously with the first coating portion 19 of the coating layer 16 in the axial direction, and the third coating portion 21 with an approximately constant material thickness is placed outside and continuously with the second coating portion 20 in the axial direction in such a way that the inner peripheral face is radially enlarged gradually. Because of this, as illustrated in FIG. 5, when the piston pin 6 is acted upon by an explosion load and thus significantly bends or flexes, at the beginning of the bending the amount of elastic deformation increases by degree in the second coating portion 20 with gradually increasing material thickness. Then, the amount of elastic deformation decreases bit by bit in the third coating portion 21 with an approximately constant thickness and the inner peripheral face radially enlarged in a stepwise manner. Accordingly, by employing the connecting rod 10 according to the embodiment, changes in contact pressure applied to the piston pin 6 can be made gradual, resulting in further advantage in wear resistance of the piston pin 6.

Further, the diameter expansion rate in the axially outer region of the tapered inner-surface portion 18 is set to be larger than the diameter expansion rate in the axially inner region of the tapered inner-surface portion 18. Because of this, the third coating portion 21 with the inner peripheral surface radially enlarged toward the outside in the axis direction can be readily formed only by uniformly depositing the coating material on the tapered inner-surface portion 18.

Further, the tapered inner-surface portion 18 is formed of a tapered surface with a plurality of stages in which the taper angle is changed in multi-stages. Because of this, the tapered inner-surface portion 18 with the diameter expansion rate being varied is easily formed by removal machining such as cutting or the like.

Further, in this example, the tapered inner-surface portion 18 has the first tapered portion 18A which is arranged adjacent to the axially outer side of the cylinder inner-surface portion 17, and the second tapered portion 18B which is arranged adjacent to the axially outer side of the first tapered portion 18A. And, the angle θ1 which the cylinder inner-surface portion 17 forms with the first tapered portion 18A is set to be greater than the angle θ2 which the first tapered portion 18A forms with the second tapered portion 18B. As a result, in the case of the embodiment, when the piston pin 6 is subjected to a large load to bend, the piston pin 6 is less subject to large contact pressure from the region around the axial end of the connecting hole 11.

In this connection, the angle θ2 which the first tapered portion 18A forms with the second tapered portion 18B is desirably an obtuse angle. In this case, as shown in FIG. 5, when the piston pin 6 bends to come into contact with the third coating portion 21, the contact pressure acting on the piston pin 6 does not easily increase to be higher. The angle θ2 which the first tapered portion 18A forms with the second tapered portion 18B is desirably equal to or greater than 135 degrees.

Chamfering is performed on a part of the peripheral edge of the connecting hole 11 on the axial end face 10Es of the extended end 10E on the connecting hole 11 side of the connecting rod 10 so that the second tapered portion 18B is formed on the part of the peripheral edge by the chamfering (the chamfered portion 40). In the case of forming the second tapered portion 18B in this manner, the second tapered portion 18B can be readily sculptured without sophisticated machining.

It should be understood that the present invention is not limited to the aforementioned embodiment and various changes in design can be made without departing from the spirit of the invention.

Figure 7:
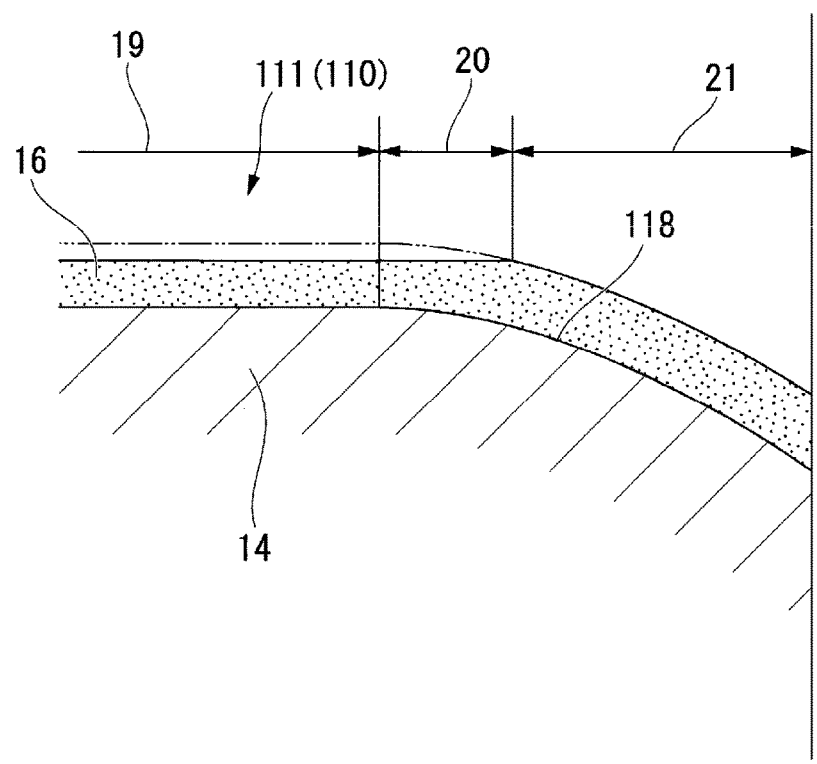
FIG. 7 is a sectional view corresponding to the IV-IV part in FIG. 3 showing a connecting rod according to another embodiment of the present invention.

For example, the tapered inner-surface portion 18 arranged adjacent to the cylinder inner-surface portion 17 of the base-material hole 15 is formed in a bent manner to be radially enlarged toward the outside in the axial direction in the foregoing embodiment, but, as in another embodiment illustrated in FIG. 7, a tapered inner-surface portion 118 may be curved in an arc shape such that an angle change occurs smoothly from the cylinder inner-surface portion 17.

REFERENCE SIGNS LIST

6 . . . Piston pin (power transmitting pin)
10, 110 . . . Connecting rod
11, 111 . . . Connecting hole
14 . . . Connecting-rod base material
15 . . . Base-material hole
16 . . . Coating layer
17 . . . Cylinder inner-surface portion
18 . . . Tapered inner-surface portion
18A . . . First tapered portion
18B . . . Second tapered portion
19 . . . First coating portion
20 . . . Second coating portion
21 . . . Third coating portion

The invention claimed is:

1. A connecting rod for an internal combustion engine, said connecting rod comprising:
   a connecting hole configured to slidably receive a power transmitting pin, the connecting hole being formed by coating an inner peripheral surface of a base-material hole formed in a connecting-rod base material, with a coating material softer than the connecting-rod base material,
   wherein the base-material hole includes
      a cylinder inner-surface portion of a constant inner diameter, formed in a central region in an axial direction; and
      a tapered inner-surface portion that is continuous with an axially outer side of the cylinder inner-surface portion and is radially enlarged in an axially outward direction,
   wherein the coating layer formed of the coating material includes
      a first coating portion deposited on the cylinder inner-surface portion and having an inner face with an approximately constant inner diameter; and
      a second coating portion deposited on the tapered inner-surface portion to adjoin the first coating portion and gradually increasing in material thickness in the axially outward direction,
   wherein the coating layer includes a third coating portion being continuous with an axially outward side of the second coating portion and having an inner peripheral face radially enlarged in the axially outward direction,
   wherein the tapered inner-surface portion of the base-material hole has a diameter expansion rate in an axially outer region set to be larger than a diameter expansion rate in an axially inner region, and wherein the tapered inner-surface portion of the base-material hole comprises a tapered surface with a plurality of stages in which the taper angle is changed in multi-stages.

2. The connecting rod for an internal combustion engine according to claim 1, wherein an inner peripheral face of the second coating portion is formed continuously with an inner peripheral face of the first coating portion to have an approximately constant inner diameter.

3. The connecting rod for an internal combustion engine according to claim 2, wherein the continuous inner peripheral face of the first coating portion and the second coating portion comprises a removal-machined surface.

4. The connecting rod for an internal combustion engine according to claim 1, wherein:
the tapered inner-surface portion of the base-material hole has a first tapered portion disposed adjacent to an axially outer side of the cylinder inner-surface portion, and a second tapered portion disposed adjacent to an axially outer side of the first tapered portion; and
wherein an angle which the cylinder inner-surface portion forms with the first tapered portion is greater than an angle which the first tapered portion forms with the second tapered portion.

5. A method of manufacturing a connecting rod for an internal combustion engine, said method comprising:
forming a connecting rod base material by a casting or forging process;
machining an inner surface of a base material hole by a cutting or grinding process, said machining including machining a cylinder inner-surface portion and a tapered inner-surface portion;
depositing a coating material on the inner surface of the base-material hole; and
machining the coating material such that a portion of the coating material covering the cylinder inner-surface portion has a uniform thickness, while a portion of the coating material covering the tapered inner-surface portion includes a portion which increases in material thickness in an axially outward direction, whereby the coating material includes a first coating portion deposited on the cylinder inner-surface portion and having an inner face with an approximately constant inner diameter, and a second coating portion deposited on the tapered inner-surface portion to adjoin the first coating portion and gradually increasing in material thickness in the axially outward direction,
wherein the coating material includes a third coating portion being continuous with an axially outward side of the second coating portion and having an inner peripheral face radially enlarged in the axially outward direction,
wherein the tapered inner-surface portion of the base-material hole has a diameter expansion rate in an axially outer region set to be larger than a diameter expansion rate in an axially inner region, and
wherein the tapered inner-surface portion of the base-material hole comprises a tapered surface with a plurality of stages in which the tapered angle is chanted in multi-stages.

6. The method according to claim 5, wherein an inner peripheral face of the second coating portion is formed continuously with an inner peripheral face of the first coating portion to have an approximately constant inner diameter.

7. The method according to claim 6, wherein the machining of the continuous inner peripheral face of the first coating portion and the second coating portion comprises a removal-machining process.

8. The method according to claim 5, wherein:
the tapered inner-surface portion of the base-material hole has a first tapered portion disposed adjacent to an axially outer side of the cylinder inner-surface portion, and a second tapered portion disposed adjacent to an axially outer side of the first tapered portion; and
wherein an angle which the cylinder inner-surface portion forms with the first tapered portion is greater than an angle which the first tapered portion forms with the second tapered portion.

* * * * *